(12) United States Patent
Madsen et al.

(10) Patent No.: US 8,004,212 B2
(45) Date of Patent: Aug. 23, 2011

(54) DRIVE APPARATUS FOR A VACUUM FLUORESCENT DISPLAY

(75) Inventors: Wayne A. Madsen, Kokomo, IN (US); Andrew R. Betts, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 462 days.

(21) Appl. No.: 12/288,881

(22) Filed: Oct. 24, 2008

(65) Prior Publication Data

US 2010/0102748 A1   Apr. 29, 2010

(51) Int. Cl.
*H05B 37/00* (2006.01)
(52) U.S. Cl. .......... 315/306; 315/107; 315/207
(58) Field of Classification Search .......... 315/306–307, 315/105–107, 119, 207, 291
See application file for complete search history.

(56) References Cited

U.S. PATENT DOCUMENTS

| 5,606,226 | A | 2/1997 | Macks et al. | |
|---|---|---|---|---|
| 6,531,825 | B1 * | 3/2003 | Iacob | 315/105 |
| 6,876,157 | B2 * | 4/2005 | Henry | 315/219 |
| 7,411,360 | B2 * | 8/2008 | Henry | 315/307 |
| 7,825,605 | B2 * | 11/2010 | Zhang et al. | 315/224 |

* cited by examiner

*Primary Examiner* — James Cho
(74) *Attorney, Agent, or Firm* — Jimmy L. Funke

(57) ABSTRACT

A VFD drive apparatus in which the filament of a VFD is coupled at a first terminal to an input voltage derived from a voltage source, and at a second terminal to a shunt voltage regulator that establishes a regulated filament current and a regulated cutoff voltage with respect to ground potential. Other electrical loads such as drive circuitry for the anodes and grid of the display are coupled between the second terminal of the filament and ground potential so that at least a portion of the filament current is supplied to such other electrical loads. Power dissipated by the shunt voltage regulator is thereby reduced, and the cost associated with providing additional voltage regulators for the other electrical loads is avoided.

6 Claims, 1 Drawing Sheet

DRIVE APPARATUS FOR A VACUUM FLUORESCENT DISPLAY

TECHNICAL FIELD

The present invention relates to an efficient and low-cost drive circuit for a vacuum fluorescent display (VFD).

BACKGROUND OF THE INVENTION

Vacuum fluorescent displays (VFDs) are typically manufactured in the form of a glass housing having an evacuated central cavity containing phosphored anode segments arranged in a suitable display pattern, a filament (cathode), and a grid disposed between the filament and the anode segments. The filament is electrically heated to generate a cloud of electrons, and selected anode segments are illuminated when positive voltages are supplied to the grid and the selected anode segments. And to turn off the display, the grid is held at a negative potential with respect to the filament.

In applications where a single DC voltage source is used to drive a VFD, one end of the filament can be coupled to the source voltage, with the other end of the filament being coupled to ground potential (i.e., the negative terminal of the voltage source) through a voltage-dropping device that establishes a cut-off voltage for the display. In this way, the display may be turned off without having to provide a grid voltage that is negative with respect to ground potential. Typically, the voltage-dropping device is mechanized with a resistor or a string of series-connected forward-biased diodes, for example. The anode/grid drive circuit and other electrical loads associated with the display are powered by the voltage source through separate power supply circuits.

The main problem with the above-described arrangement is that the power dissipated in the voltage-dropping device is essentially wasted. Additionally, separately supplying power to the filament and the other electrical loads is not particularly cost-effective. Accordingly, what is needed is a more efficient and cost-effective drive arrangement for a VFD.

SUMMARY OF THE INVENTION

The present invention is directed to an improved drive apparatus for a VFD, where the filament of the display is coupled at a first end to an input voltage derived from a voltage source, and at a second end to a shunt voltage regulator that establishes a regulated filament current and a regulated cutoff voltage with respect to ground potential. Other electrical loads such as drive circuitry for the anodes and grid of the display are coupled between the second end of the filament and ground potential so that at least a portion of the filament current is supplied to such other electrical loads. Power dissipated by the shunt voltage regulator is thereby reduced, and the cost associated with providing additional voltage regulators for the other electrical loads is avoided.

DESCRIPTION OF THE PREFERRED EMBODIMENT

The drive apparatus of the present invention is disclosed herein in the context of an instrument panel display powered from the storage battery of a motor vehicle, but it should be understood that the disclosed drive apparatus is equally applicable to other vehicular and non-vehicular applications.

Figure 1:
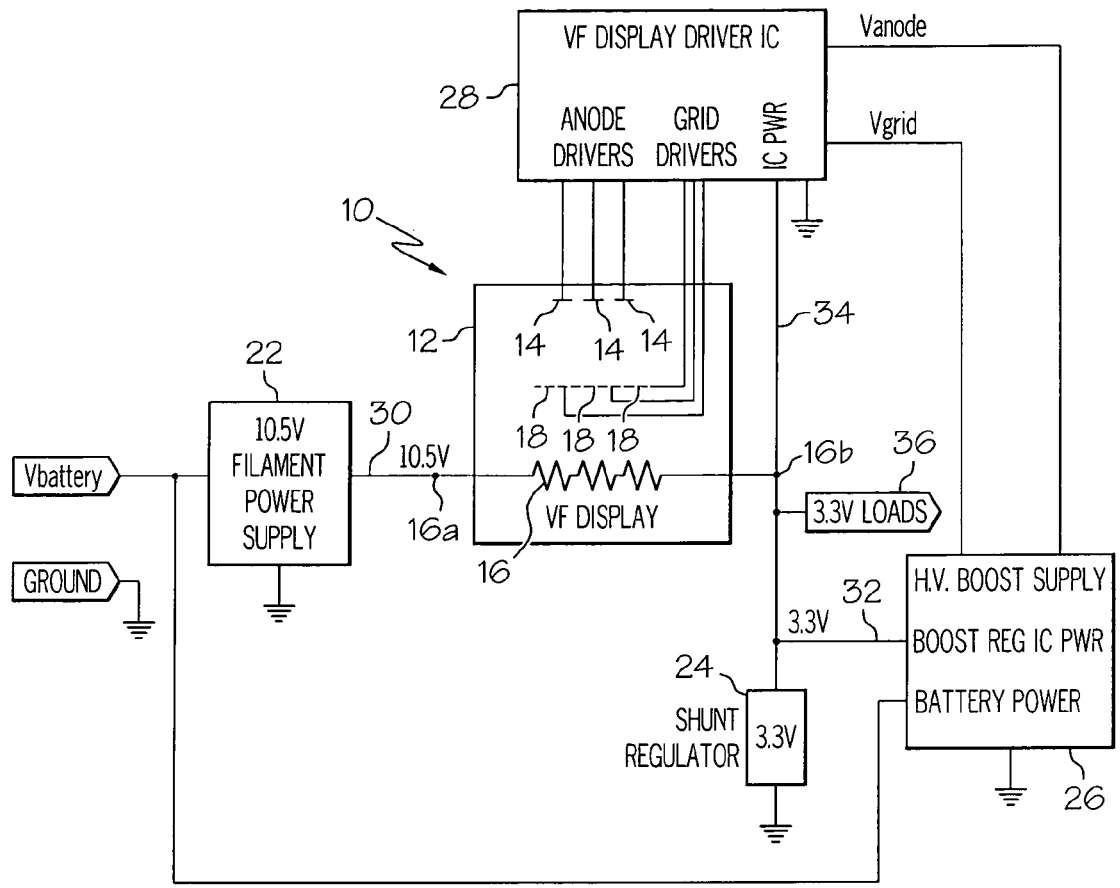
FIG. 1 is a block diagram of a drive circuit for a VFD according to this invention.

Referring to FIG. 1, the reference numeral 10 generally designates a conventional VFD including an evacuated glass housing 12, a number of phosphored anode segments 14, a filament or cathode 16, and a number of grid segments 18 disposed between the filament 16 and the anode segments 14. In general, the display 10 is activated by passing electrical current through the filament 16 to generate a localized cloud of electrons, and supplying positive voltages to selected anode and grid segments 14, 18 to drive the electrons into the selected anode segments. To prevent anode illumination, the respective grid segments 18 are held at a voltage potential that is negative with respect to the voltage potential of the filament 16.

The drive circuit for VFD 10 is generally designated in FIG. 1 by the reference numeral 20. The illustrated drive circuit 20 includes an input voltage regulator 22 for establishing an input voltage, a shunt voltage regulator 24 for establishing a cut-off voltage for VFD 10, a boost power supply 26, and an integrated anode/grid drive circuit 28. In general, the voltage regulators 22 and 24 regulate the current through filament 16, the anode/grid drive circuit 28 controls the voltage applied to anode segments 14 and grid segments 18, and the boost power supply generates elevated anode and grid voltages (Vanode, Vgrid) for use by the anode/grid drive circuit 28.

In the illustrated arrangement, the drive circuit 20 is powered by a 12 VDC storage battery (not shown) of a vehicular electrical system, designated in FIG. 1 by the symbols VBattery and Ground. Since the voltage VBattery is subject to substantial variation depending on the battery charging rate and the current being supplied to other vehicular electrical loads, the input voltage regulator 22 is used to establish a substantially constant input voltage of 10.5 VDC on line 30 so that the display brightness of VFD 10 is insensitive to fluctuations in VBattery. In applications where the drive circuit 20 is powered by a closely regulated voltage source, the input voltage regulator 22 may be omitted.

The filament 16 of VFD 10 has two terminals, designated in FIG. 1 by the reference numerals 16a and 16b. The filament terminal 16a is connected to the input voltage on line 30, and the shunt regulator 24 is connected between the filament terminal 16b and ground potential to define a regulated cutoff voltage at the filament terminal 16b. In the illustrated embodiment, the shunt regulator 24 establishes a cutoff voltage of 3.3 VDC; consequently, the voltage across filament 16 is regulated to 7.2 VDC, and selected grid segments 18 may be held at a positive voltage potential below 3.3 VDC to negate anode illumination.

According to this invention, the regulated cutoff voltage at the filament terminal 16b is used to supply power to various electrical loads other than the VFD 10. In the illustrated embodiment, the cutoff voltage at filament terminal 16b supplies power to a regulator circuit (not shown) of boost power supply 26 via line 32, and to the anode/grid drive circuit 28 via line 34. In this way, a portion of the electrical current passing through filament 16 also passes through boost power supply 26 and anode/grid drive circuit 28. This reduces the amount of power dissipated by shunt voltage regulator 24, and avoids the cost that is ordinarily expended in connection with individually providing power supply voltages for anode/grid drive circuit 28 and the regulator circuit of boost power supply 26.

Optionally, the cutoff voltage may be supplied to different or additional electrical loads, as indicated by the power supply terminal 36.

Figure 2:
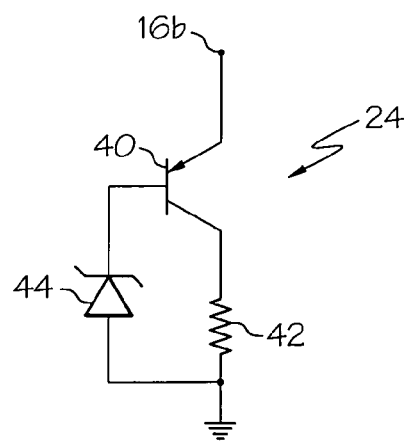
FIG. 2 is a circuit diagram depicting a shunt voltage regulator for the drive circuit of FIG. 1, according to a preferred embodiment of this invention.

FIG. 2 depicts a preferred mechanization of the shunt voltage regulator 24, including a PNP bipolar transistor 40, a resistor 42, and a Zener diode 44. The filament current not supplied to other electrical loads flows predominantly through the emitter-collector circuit of transistor 40 and the resistor 44. The conduction of transistor 40, and hence the cutoff voltage at the filament terminal 16b, is regulated by the Zener voltage of Zener diode 44, along with the base-emitter voltage (Vbe) of transistor 40. The resistor 42 dissipates power and also limits the maximum current though the regulator 24. While the circuit of FIG. 2 represents the preferred embodiment of shunt regulator 24, it should be understood that other shunt regulator circuits such as a commercially available LMV431 regulator or a discrete operational amplifier regulator may be substituted for the circuit of FIG. 2. In fact, even a conventional voltage dropping circuit such as a resistor or a string of series-connected forward-biased diodes may be used, if desired. However, the illustrated circuit (or a comparable circuit) is generally preferred because it is less sensitive to variations in temperature.

In summary, the drive apparatus of the present invention provides a particularly efficient and cost-effective way of driving a VFD. It both reduces overall power dissipation and eliminates power supply components for related electrical loads. While the present invention has been described with respect to the illustrated embodiment, it is recognized that numerous modifications and variations in addition to those mentioned herein will occur to those skilled in the art. For example, the power supply and regulated voltages may be different than shown, and so forth. Accordingly, it is intended that the invention not be limited to the disclosed embodiment, but that it have the full scope permitted by the language of the following claims.

The invention claimed is:

1. Apparatus for driving a VFD including a filament having first and second terminals, the apparatus comprising:
    a DC source defining a supply voltage and a ground potential;
    means coupled to the supply voltage for establishing an input voltage that is coupled to the first terminal of the filament;
    a shunt voltage regulator coupled between the second terminal of the filament and ground potential for establishing a regulated filament current and a regulated cutoff voltage at the second terminal of said filament, said regulated cutoff voltage being intermediate said input voltage and said ground potential; and
    at least one electrical load coupled between the second terminal of the filament and said ground potential so as to supply at least a portion of said filament current to said electrical load.

2. The apparatus of claim 1, where said VFD includes anode and grid segments, and where:
    the at least one electrical load is a driver circuit for supplying desired voltages to said anode and grid segments.

3. The apparatus of claim 1, where said VFD includes anode and grid segments, and where:
    the at least one electrical load is a boost power supply for generating drive voltages for said anode and grid segments.

4. The apparatus of claim 1, where:
    said shunt voltage regulator comprises a transistor connected between the second terminal of the filament and ground potential, and a voltage reference device for controlling a conduction of said transistor.

5. The apparatus of claim 1, where:
    said shunt voltage regulator comprises a resistor connected between the second terminal of the filament and ground potential.

6. The apparatus of claim 1, where:
    said shunt voltage regulator comprises a series of diodes connected between the second terminal of the filament and ground potential.

* * * * *